(12) United States Patent
Yeh

(10) Patent No.: US 8,729,853 B2
(45) Date of Patent: May 20, 2014

(54) WIRELESS CHARGING DEVICE FOR PORTABLE ELECTRONIC DEVICE

(76) Inventor: Ming-Hsiang Yeh, Taipei (TW)

( * ) Notice: Subject to any disclaimer, the term of this patent is extended or adjusted under 35 U.S.C. 154(b) by 335 days.

(21) Appl. No.: 13/344,853

(22) Filed: Jan. 6, 2012

(65) Prior Publication Data

US 2013/0175981 A1    Jul. 11, 2013

(51) Int. Cl.
*H02J 7/00*    (2006.01)

(52) U.S. Cl.
USPC .......................... 320/108; 455/41.1

(58) Field of Classification Search
CPC .................. H02J 7/025; H04B 5/00
USPC .......................... 320/108; 455/41.1
See application file for complete search history.

(56) References Cited

U.S. PATENT DOCUMENTS

2010/0213895 A1*  8/2010  Keating et al. ................ 320/108
2011/0156636 A1*  6/2011  Kim .............................. 320/108

* cited by examiner

*Primary Examiner* — Drew A Dunn
*Assistant Examiner* — Nathaniel Pelton
(74) *Attorney, Agent, or Firm* — Bacon & Thomas, PLLC

(57) ABSTRACT

Disclosed is a wireless charging device for portable electronic device. The portable electronic device has a circuit device that includes a battery. The wireless charging device includes: a wireless transmission unit and a logic control unit, a step-up/step-down unit, first and second reverse current protectors, and at least a supercapacitor electrically connected between the circuit device and the wireless transmission unit. The first and second reverse current protectors function to prevent reverse current and to switch. The step-up/step-down unit controls step-up conversion in discharging and step-down conversion in charging. The logic control unit detects if a load exists on an opposite side of the wireless transmission unit and controls the operations of the step-up/step-down unit and the first and second reverse current protectors. The supercapacitor absorbs surge occurring in each charging operation to prevent accumulated damage caused by the charging operations.

12 Claims, 3 Drawing Sheets

WIRELESS CHARGING DEVICE FOR PORTABLE ELECTRONIC DEVICE

FIELD OF THE INVENTION

The present invention relates to a wireless charging device, and in particular to a wireless charging device for portable electronic device that protects a rechargeable battery from accumulated damage caused by repeated charging and improves wireless power transmission efficiency and step-up/step-down efficiency.

BACKGROUND OF THE INVENTION

Wireless charging is now prevailing and it is certain that in the future, wireless charging can be done everywhere.

Wireless charging everywhere provides great convenience, but surges that occur in charging operations, both wired and wireless charging, causes accumulated damage to the rechargeable batteries and the shortening, in an progressive manner, the lifespan of the batteries. In other words, the more times charging has been done, the shorter the lifespan of the battery will be and the poorer the charging/discharging efficiency of the battery will be.

In a wireless charging everywhere environment, the sphere of activity of human beings must be provided with a variety of charging sites, or people may frequently pass through the charging site. Under this condition, the portable electronic device carried by their owners will be definitely subjected to charging several times in a single day and this surely shortens the lifespan of the batteries contained in the portable electronic devices.

Further, since wireless power transmission is still of low efficiency today, meaning the amount of discharged electricity is greater than the amount of charged electricity. In addition, the step-up/step-down conversion is also of low efficiency heretofore. All these make wireless power transmission impractical and this has been concerned by general consumers for quite a long time.

Thus, the present invention aims to provide a wireless charging device that protects a rechargeable battery from accumulated damage caused by frequent charging and even improves the efficiency of wireless power transmission and efficiency of step-up and step-down conversions.

SUMMARY OF THE INVENTION

An objective of the present invention is to provide a wireless charging device, which makes use of the arrangement of supercapacitors in specific locations and the supercapacitors having resistances lower than a battery to allow, in a charging operation, the supercapacitors to be charged first for blocking surges occurring in the charging operation and thus realizing protection against accumulated damage caused by charging of the battery; makes use of the function of preventing reverse current by first and second reverse current protectors to eliminate electrical leakage to thereby save power; and makes use of a step-up/step-down unit that is a step-up/step-down unit with synchronous rectification (preferably MOSFET (Metal-Oxide-Semiconductor Field-Effect Transistor) type synchronous rectification) to improve efficiency of step-up/step-down conversion.

Another objective of the present invention is to provide a wireless charging device, which makes use of first to third reverse current protectors that comprise first and second MOSFETs to serve as important components for preventing reverse current and switching in order to reduce electrical loss in conduction, so that discharging efficiency is improved and wireless power transmission efficiency is improved.

To realize the above objectives, the present invention provides a wireless charging device, which is applicable to a portable electronic device having a circuit device. The circuit device is electrically connected to a power receiving terminal and a battery. The wireless charging device comprises a logic control unit, a wireless transmission unit, a step-up/step-down unit, a first reverse current protector, a second reverse current protector, and a first supercapacitor, wherein the logic control unit comprises a plurality of pins; the wireless transmission unit has a transmission terminal and a test terminal, the test terminal being electrically connected to a detection pin of the logic control unit; the step-up/step-down unit has a first voltage regulation terminal, a second voltage regulation terminal, and two control terminals, the second voltage regulation terminal being electrically connected to the transmission terminal of the wireless transmission unit, the two control terminals being respectively and electrically connected to first and second control pins of the logic control unit, a power pin of the logic control unit being electrically connected to the second voltage regulation terminal and the transmission terminal that are connected to each other, the step-up/step-down unit being a step-up/step-down unit with synchronous rectification; the first reverse current protector has an input terminal, an output terminal, and a control terminal, the input terminal and the output terminal being respectively and electrically connected to a discharging terminal of the battery and the first voltage regulation terminal of the step-up/step-down unit, the control terminal being electrically connected to a third control pin of the logic control unit; the second reverse current protector has an input terminal, an output terminal, and a control terminal, the output terminal and the input terminal being respectively and electrically connected to the power receiving terminal of the circuit device and the first voltage regulation terminal of the step-up/step-down unit, the control terminal being electrically connected to a fifth control pin of the logic control unit; and the first supercapacitor has an end electrically connected to a connection between the power receiving terminal of the circuit device and the output terminal of the second reverse current protector and forming a first node at the connection and an opposite end grounded.

As such, the supercapacitor may be used block surges occurring in each charging operation in order to protect a battery from accumulated damaged caused by charging. Further, the first and second the reverse current protectors provide a function of preventing reverse current so as to eliminate electrical leakage and thus save power. Further, the step-up/step-down unit is a step-up/step-down unit with synchronous rectification so as to improve efficiency of step-up/step-down conversion.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
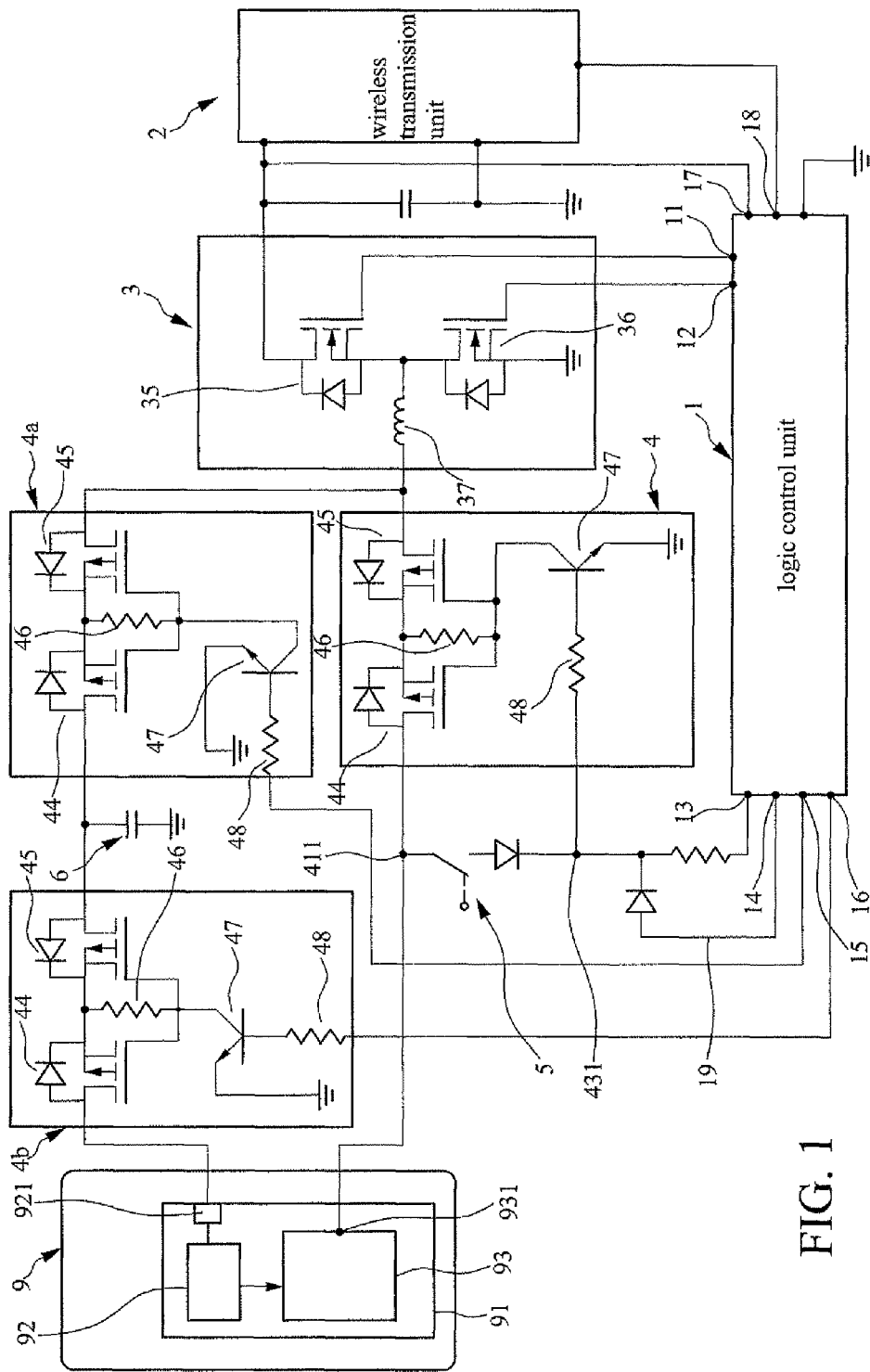
FIG. 1 is a circuit diagram of a wireless charging device according to a first embodiment of the present invention electrically connected to a portable electronic device.

The present invention provides a wireless charging device for portable electronic devices. A first embodiment of the present invention is shown in FIGS. 1 and 2 and a second embodiment is shown in FIG. 3.

First Embodiment

Figure 2:
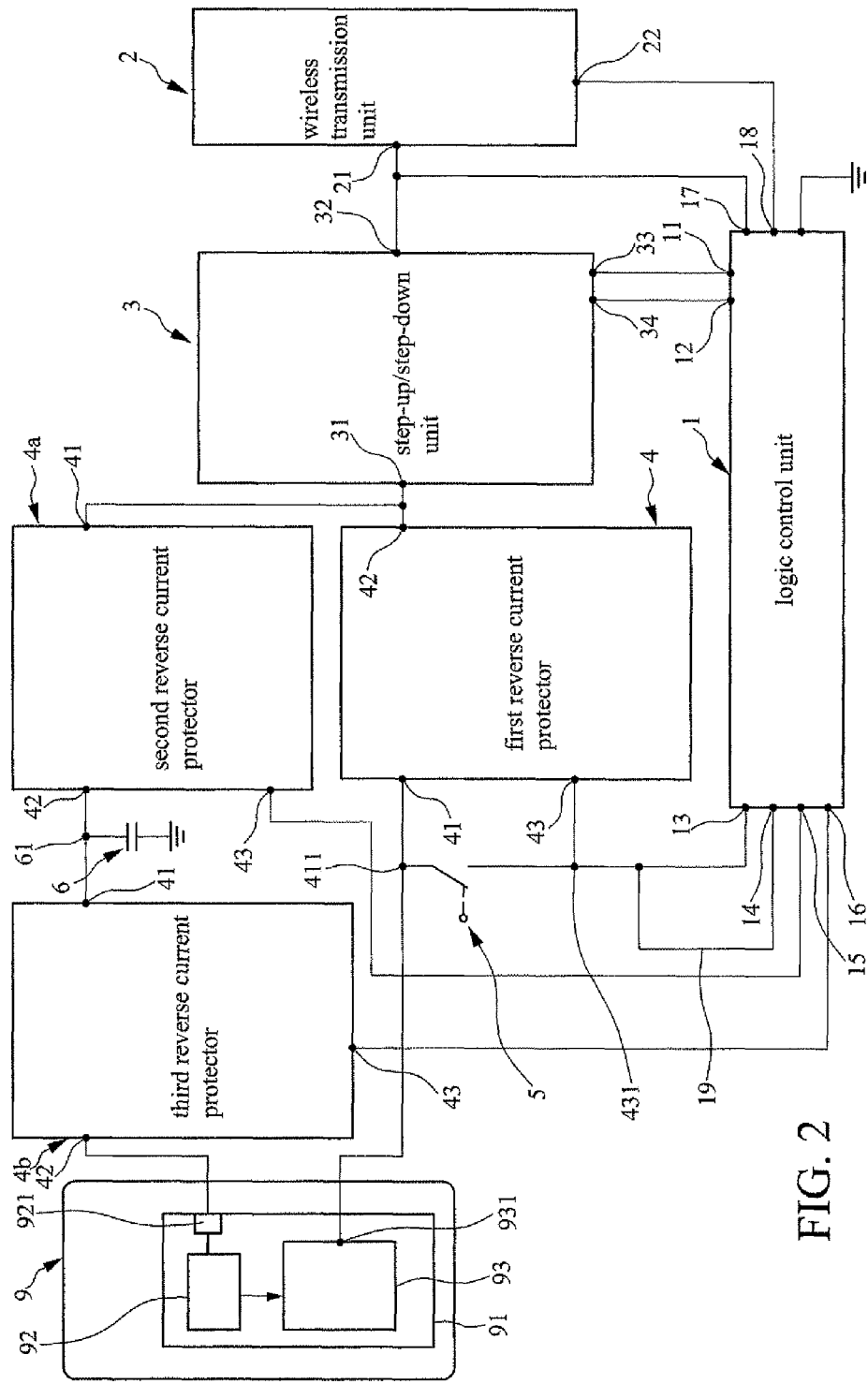
FIG. 2 is an equivalent circuit block diagram of FIG. 1.
Figure 3:
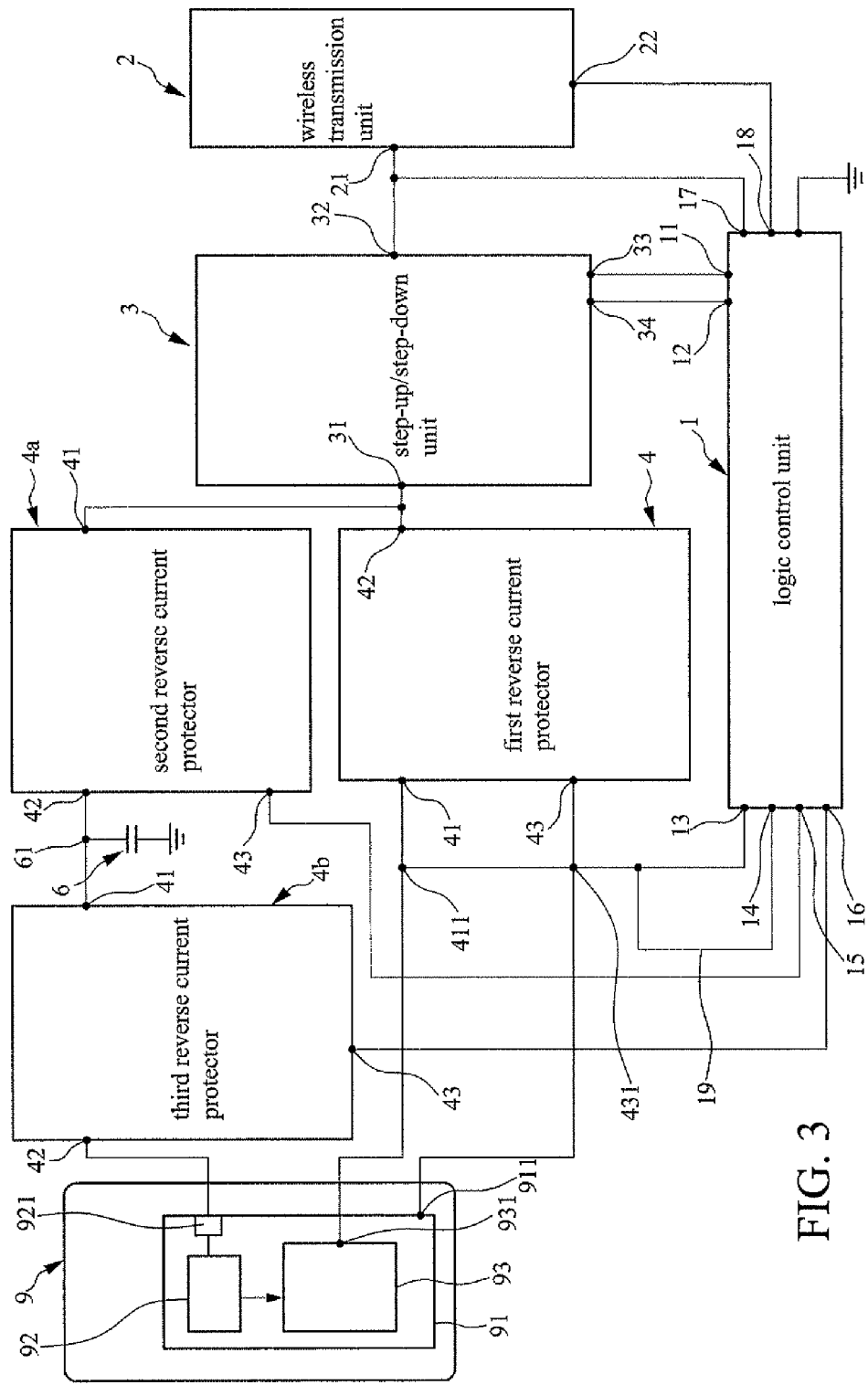
FIG. 3 is an equivalent circuit block diagram of a second embodiment of the present invention.

Referring to FIG. 2, a wireless charging device according to the first embodiment of the present invention is shown, which is applicable to a portable electronic device 9 comprising a circuit device 91. The circuit device 91 is electrically connected to a power receiving terminal 921 and a battery 93, and preferably, the circuit device 91 further comprises a protection circuit 92. The protection circuit 92 is electrically connected between the power receiving terminal 921 and the battery 93. The wireless charging device comprises: a logic control unit 1, a wireless transmission unit 2, a step-up/step-down unit 3, a first reverse current protector 4, a second reverse current protector 4a, and a first supercapacitor 6, and preferably further comprises a third reverse current protector 4b and a second supercapacitor (not shown).

The logic control unit 1 comprises first to sixth control pins 11-16, a power pin 17, and detection pin 18. The remaining pin that is not labeled is a grounding pin.

The wireless transmission unit 2 comprises a transmission terminal 21 and a test terminal 22. The test terminal 22 is electrically connected to the detection pin 18 of the logic control unit 1.

The step-up/step-down unit 3 comprises a first voltage regulation terminal 31, a second voltage regulation terminal 32, and two control terminals 33, 34. The second voltage regulation terminal 32 is electrically connected to the transmission terminal 21 of the wireless transmission unit 2. The two control terminals 33, 34 are respectively and electrically connected to the first and second control pins 11, 12 of the logic control unit 1. The power pin 17 of the logic control unit 1 is electrically connected to the second voltage regulation terminal 32 and the transmission terminal 21 that are connected to each other. The step-up/step-down unit 3 is a step-up/step-down unit 3 that features synchronous rectification. Preferably, the step-up/step-down unit 3 featuring synchronous rectification is of MOSFET (Metal-Oxide-Semiconductor Field-Effect Transistor) synchronous rectification. Referring to both FIGS. 1 and 2, the step-up/step-down unit 3 featuring synchronous rectification comprises an inductor 37 and two serially-connected and identically-directed first and second MOSFETs 35, 36. The first and second MOSFETs 35, 36 each have a control terminal (not labeled), and the two control terminals are respectively and electrically connected to the two control terminals 33, 34 of the step-up/step-down unit 3. A terminal of the serially-connected first and second MOSFETs 35, 36 is electrically connected to the second voltage regulation terminal 32, and an opposite terminal grounded. The inductor 37 has an end electrically connected to the first voltage regulation terminal 31 and an opposite end electrically connected between the first and second MOSFETs 35, 36.

The first reverse current protector 4 comprises an input terminal 41, an output terminal 42, and a control terminal 43. The input terminal 41 and the output terminal 42 are respectively and electrically connected to the discharging terminal 931 of the battery 93 and the first voltage regulation terminal 31 of the step-up/step-down unit 3. The control terminal 43 is electrically connected to a third control pin (for transmission identification) 13 of the logic control unit 1. The control terminal 43 of the first reverse current protector 4 and the third control pin 13 of the logic control unit 1 form a second node 431, and the discharging terminal 931 of the battery 93 and the input terminal 41 of the first reverse current protector 4 form therebetween a third node 411.

The second node 431 and the third node 411 are in electrical connection (not shown) with each other so that the wireless charging device of the present invention is only allowed to receive electrical power for its own use in a receiving mode.

Referring collectively to FIGS. 1 and 2, a switch for switching between a transmission mode and the receiving mode can apparently be provided. As shown, a control switch 5 is electrically connected between the second node 431 and the third node 411 in order to performing the switching between the transmission mode and the receiving mode. Preferably, the control switch 5 is an automatic returning switch, or it can even be that the fourth control pin 14 of the logic control unit 1 is electrically connected, in a circuit form, to the third control pin (for transmission identification) 13, namely the transmission sustaining circuit 19 shown in the drawings.

The second reverse current protector 4a also has an input terminal 41, an output terminal 42, and a control terminal 43. The output terminal 42 and the input terminal 41 are respectively and electrically connected to the power receiving terminal 921 of the protection circuit 92 of the circuit device 91 and the first voltage regulation terminal 31 of the step-up/step-down unit 3. The control terminal 43 is electrically connected to the fifth control pin 15 of the logic control unit 1.

The first supercapacitor 6 has an end electrically connected to connection between the power receiving terminal 921 of the protection circuit 92 of the circuit device 91 and the output terminal 42 of the second reverse current protector 4a and forms a first node 61 there. Another end of the first supercapacitor 6 is grounded.

Preferably, the wireless charging device according to the first embodiment of the present invention further comprises a third reverse current protector 4b. The third reverse current protector 4b also comprises an input terminal 41, an output terminal 42, and a control terminal 43. The output terminal 42 and the input terminal 41 are respectively and electrically connected to the power receiving terminal 921 of the protection circuit 92 of the circuit device 91 and the first node 61. The control terminal 43 is electrically connected to the sixth control pin 16 of the logic control unit 1, whereby a control signal supplied through the sixth control pin 16 of the logic control unit 1 can be used to control ON/OFF state of the third reverse current protector 4b and thus control charging the battery 93 or not. In addition, it is possible to further comprise a second supercapacitor (not shown). The second supercapacitor is connected in parallel to the battery 93. It is apparent that the supercapacitors arranged in the wireless charging device of the present invention can include only the first supercapacitor 6 or only the second supercapacitor (not shown), or the first supercapacitor 6 and the second supercapacitor are both included.

Since resistances of the first supercapacitor 6 and the second supercapacitor are lower than that of the battery 93, each time a charging operation is performed, the supercapacitors are charged first, whereby the supercapacitors may function to resist the surge occurring in the charging operation. Further, the supercapacitors can be easily charged in full and then immediately charge the battery 93.

Referring to FIGS. 1 and 2, each reverse current protector (4, 4a, 4b) comprises a first resistor 46 and serially-connected oppositely-directed first and second MOSFETs 44, 45. Two ends of the two serially-connected MOSFETs are respectively the input terminal 41 and the output terminal 42 of the reverse current protector. The first and second MOSFETs 44, 45 each have a control terminal (not labeled), and the two control terminals are electrically connected to the control terminal 43 of the reverse current protector. The first resistor 46 has an end electrically connected between the first and second MOSFETs 44, 45 and an opposite end also electrically connected to the control terminal 43 of the reverse current protector. Further, each reverse current protector (4, 4a, 4b) further comprises a transistor 47 and a second resistor 48. The transistor 47 has a first terminal electrically connected to the control terminals (not labeled) of the first and second MOSFETs 44, 45, and a second terminal of the transistor 47 is grounded. The second resistor 48 is electrically connected between a third terminal of the transistor 47 and the control terminal 43 of the reverse current protector.

The transmission mode of the wireless charging device according to the first embodiment of the present invention is described as follows:

The wireless charging device is normally set in the receiving mode, so that to switch to the transmission mode, the control switch 5 is actuated to effect switching.

Presumably, a portable electronic device 9 that includes a wireless charging device according to the present invention intends to transmit its own power in a wireless manner to another electronic device equipped with the wireless charging device. The control switch 5 is pressed down to make it conducting. Electrical power from the battery 93 flows through the control switch 5 and then the third control pin (namely transmission identification control pin for transmission identification purpose) 13 to allow the logic control unit 1 to identify that it has been switched to the transmission mode. When the control switch 5 is set conducting, the first reverse current protector 4 is also set conducting so that the electrical power of the battery 93 that was previously blocked by the first reverse current protector 4 is now allowed to pass, and then flow through the first MOSFET 35 of the step-up/step-down unit 3 to be applied to the power pin 17 of the logic control unit 1 to realize supply of power to the logic control unit 1. Further, the second reverse current protector 4a blocks the electrical power of the battery 93 from charging back.

When the logic control unit 1 identifies the switching to the transmission mode, the transmission sustaining circuit (which is provided to maintain the transmission mode) 19 to make the fourth control pin 14 maintaining supplying a transmission sustaining signal to the third control pin 13 to achieve the effect of sustaining the transmission thereby maintaining in a transmission condition.

The detection pin 18 of the logic control unit 1 detects if an electronic device to be charged exists in the opposite side of the wireless transmission unit 2 that may comprises a built-in antenna. If no detection is found, then the logic control unit 1 stops the transmission. The detection is realized by having the detection pin 18 detecting if a load exists in the opposite side of the wireless transmission unit 2:

If there is no load: the transmission is stopped;

If there is a load: the logic control unit 1 uses the first and second control pins 11, 12 to output a PWM (Pulse Width Modulation) signal that drives the first and second MOSFETs 35, 36 of the step-up/step-down unit 3. With such a PWM signal, the first and second MOSFETs 35, 36 can successively on and off with an extremely high frequency. When the second MOSFET 36 is on and the first MOSFET 35 is off, since both the second MOSFET 36 and the battery 93 have an end grounded, thereby forming a closed loop, so that electrical power of the battery 93 can flow through the first reverse current protector 4 and the inductor 37 of the step-up/step-down unit 3 to further flow through the second MOSFET 36, and thus charging the inductor 37. When the first MOSFET 35 is on and the second MOSFET 36 is off, the electrical power of the battery 93, after flowing through the inductor 37, passing the first MOSFET 35, so that the charged inductor 37 may discharge through the wireless transmission unit 2.

In other words, the alternate on and off states and the alternate off and on states of the first and second MOSFETs 35, 36 may respectively charge the inductor 37 and discharge the inductor 37. When an electrical current flows through an internal winding of the wireless transmission unit 2, the winding generates magnetic lines of fore and the electronic device on the opposite side receives and converts the magnetic lines of force into an electrical current.

During transmission, the route from the battery 93 to the wireless transmission unit 2 passes the first and second MOSFETs 35, 36 contained in the step-up/step-down unit 3, and this is stepping up (such as stepping from 3.6-4.2V DC to around 5V AC); on the contrary, it is stepping down from the wireless transmission unit 2 to the battery 93.

If one of the first and second MOSFETs 35, 36 is operating to control stepping up and down, then the other is operative to control synchronous rectification.

The receiving mode of the wireless charging device according to the first embodiment of the present invention is described as follows:

When a portable electronic device 9 that is equipped with a wireless charging device according to the present invention receives electrical power transmitted from an opposite side of the wireless transmission unit, the electrical power flows first through the power pin 17 to the logic control unit 1, and then, the received electrical power is transmitted through the step-up/step-down unit 3 for stepping down conversion.

The logic control unit 1 uses the transmission sustaining circuit 19 to set the first reverse current protector 4 in an OFF condition and uses a control signal supplied from the fifth control pin 15 of the logic control unit 1 to set the second reverse current protector 4a in an ON condition, so that the stepped-down power is applied through the second reverse current protector 4a and the first supercapacitor 6 that absorbs the surges (preferably further flowing through the third reverse current protector 4b) to thereby supply to the battery 93 of the portable electronic device 9. It is apparent that the protection circuit 92 may provide protection by limiting the range of charging of the battery 93 within a preset range (such as 4-6V DC). When the battery 93 is fully charged, the protection circuit 92 stops the charging, whereby the electronic device on the opposite side detects no loading and automatically shut down the charging operation. (Even in a discharging operation, if the power remaining in the battery of its own is lower than a preset level, the discharging will be terminated.)

When the logic control unit 1 is switched to the transmission mode, the fourth control pin 14 continuously supplies a transmission sustaining signal to maintain the first reverse current protector 4 in an ON condition; when the logic control unit 1 is switched to the receiving mode, the fifth control pin 15 continuously supplies a receiving sustaining signal to maintain the second reverse current protector 4a in an ON condition.

Second Embodiment

Referring to FIG. 3, a wireless charging device according to a second embodiment of the present invention is shown, which is similar to the wireless charging device of the first embodiment with the difference that the control switch 5 shown in the first embodiment is omitted in the second embodiment and a control signal supplied from the portable electronic device 9 replaces the control switch 5 of the first embodiment to perform the control operation.

As shown, the circuit device 91 of the portable electronic device 9 comprises a signal output terminal 911, which is manually operative (such as pressing a physical button of the portable electronic device 9 or touching a virtual button formed on a touch screen of the portable electronic device 9) in order to have the signal output terminal 911 of the circuit device 91 supplying a control signal.

In the wireless charging device according to the second embodiment of the present invention, the second node 431 of the first reverse current protector 4 is electrically connected to the signal output terminal 911 in order to receive the control signal supplied from the signal output terminal 911 to switch the logic control unit 1 (via the third control pin 13) to the transmission mode. In this arrangement, the fourth control pin 14 of the logic control unit 1 can be electrically connected, in a circuit form, to the third control pin 13, namely the transmission sustaining circuit 19 shown in the drawing.

In summary, the wireless charging device for portable electronic device according to the present invention has the following features: Supercapacitors are arranged at specific locations and the supercapacitors have resistances lower than the battery, so that in a charging operation, the supercapacitors will be charged first and the supercapacitors can block surges occurring in charging processes in order to eliminate the accumulated damage caused in charging a battery. The first and second reverse current protectors 4, 4a provide protection against reverse current so that electrical leakage can be prevented and thus realize saving of power. The step-up/step-down unit 2 is arranged as a step-up/step-down unit with synchronous rectification, preferably MOSFET type synchronous rectification, so that step-up/step-down conversion efficiency can be improved. The first to third reverse current protectors 4, 4a, 4b are provided that use the first and second MOSFETs 44, 45 as important components for reverse current prevention or switching, so that the electrical power consumed in conduction is reduced ant thus the discharging efficiency is improved to thereby improving power transmission efficiency.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A wireless charging device, which is applicable to a portable electronic device having a circuit device, the circuit device being electrically connected to a power receiving terminal and a battery, the wireless charging device comprising:
  a logic control unit, which comprises a plurality of pins;
  a wireless transmission unit, which has a transmission terminal and a test terminal, the test terminal being electrically connected to a detection pin of the logic control unit;
  a step-up/step-down unit, which has a first voltage regulation terminal, a second voltage regulation terminal, and two control terminals, the second voltage regulation terminal being electrically connected to the transmission terminal of the wireless transmission unit, the two control terminals being respectively and electrically connected to first and second control pins of the logic control unit, a power pin of the logic control unit being electrically connected to the second voltage regulation terminal and the transmission terminal that are connected to each other, the step-up/step-down unit being a step-up/step-down unit with synchronous rectification;
  a first reverse current protector, which has an input terminal, an output terminal, and a control terminal, the input terminal and the output terminal being respectively and electrically connected to a discharging terminal of the battery and the first voltage regulation terminal of the step-up/step-down unit, the control terminal being electrically connected to a third control pin of the logic control unit;
  wherein the control terminal of the first reverse current protector and the third control in of the logic control unit form therebetween a second node and the discharging terminal of the battery and the input terminal of the first reverse current protector form therebetween a third node, the second and third nodes being electrically connected to each other, the second node being electrically connected to a signal output terminal of the circuit device;
  a second reverse current protector, which has an input terminal, an output terminal, and a control terminal, the output terminal and the input terminal being respectively and electrically connected to the power receiving terminal of the circuit device and the first voltage regulation terminal of the step-up/step-down unit, the control terminal being electrically connected to a fifth control pin of the logic control unit; and
  a first supercapacitor, which has an end electrically connected to a connection between the power receiving terminal of the circuit device and the output terminal of the second reverse current protector and forming a first node at the connection and an opposite end grounded.

2. The wireless charging device as claimed in claim 1 further comprising a second supercapacitor, the second supercapacitor being connected in parallel with the battery.

3. The wireless charging device as claimed in claim 1, wherein the circuit device comprises a protection circuit, the protection circuit being electrically connected between the battery and the power receiving terminal.

4. The wireless charging device as claimed in claim 1, wherein the step-up/step-down unit with synchronous rectification is of MOSFET type synchronous rectification.

5. The wireless charging device as claimed in claim 4, wherein the step-up/step-down unit with synchronous rectification comprises an inductor and two serially-connected and identically-directed MOSFETs, the two MOSFETs each having a control terminal, the two control terminals being respectively and electrically connected to the two control terminals of the step-up/step-down unit, the two serially-connected MOSFETs having a terminal electrically connected to the second voltage regulation terminal and an opposite terminal grounded, the inductor having an end electrically connected to the first voltage regulation terminal and an opposite end electrically connected between the two MOSFETs.

6. The wireless charging device as claimed in claim 1 further comprising a third reverse current protector, the third reverse current protector having an input terminal, an output terminal, and a control terminal, the output terminal and the input terminal being respectively and electrically connected to the power receiving terminal of the circuit device and the first node, the control terminal being electrically connected to a sixth control pin of the logic control unit.

7. The wireless charging device as claimed in claim 6, wherein each of the reverse current protectors comprises a first resistor and two serially-connected and oppositely-directed MOSFETs, the two serially-connected MOSFETs having two ends serving as the input terminal and the output terminal of the reverse current protector, the two MOSFETs each having a control terminal, the two control terminals being electrically connected to the control terminal of the reverse current protector, the first resistor having an end electrically connected between the two MOSFETs and an opposite end electrically connected to the control terminal of the reverse current protector.

8. The wireless charging device as claimed in claim 7, wherein each of the reverse current protectors comprises a transistor and a second resistor, the transistor having a first terminal electrically connected to the control terminals of the two MOSFETs, the transistor having a second terminal grounded, the second resistor being electrically connected between a third terminal of the transistor and the control terminal of the reverse current protector.

9. The wireless charging device as claimed in claim 1, wherein the control terminal of the first reverse current protector and the third control pin of the logic control unit form a second node therebetween and the discharging terminal of the battery and the input terminal of the first reverse current protector form therebetween a third node, a control switch being electrically connected between the second node and the third node.

10. The wireless charging device as claimed in claim 9, wherein the control switch is an automatically returning switch.

11. The wireless charging device as claimed in claim 9, wherein the fourth control pin of the logic control unit is electrically connected, in a circuit form, to the third control pin.

12. The wireless charging device as claimed in claim 1, wherein the fourth control pin of the logic control unit is electrically connected, in a circuit form, to the third control pin.

* * * * *